(12) United States Patent
Khayrallah et al.

(10) Patent No.: US 8,630,375 B2
(45) Date of Patent: Jan. 14, 2014

(54) METHOD AND APPARATUS FOR RECEIVED SIGNAL PROCESSING IN A MULTI-STAGE RECEIVER

(75) Inventors: Ali Khayrallah, Mountain View, CA (US); Stephen Grant, Pleasanton, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/545,611

(22) Filed: Jul. 10, 2012

(65) Prior Publication Data

US 2013/0051502 A1    Feb. 28, 2013

Related U.S. Application Data

(60) Provisional application No. 61/528,322, filed on Aug. 29, 2011.

(51) Int. Cl.
*H04L 27/08* (2006.01)

(52) U.S. Cl.
USPC ........... 375/340; 375/130; 375/260; 375/262; 375/265; 375/267; 375/343; 375/346; 375/347; 375/350

(58) Field of Classification Search
USPC ......... 375/130, 260, 262, 265, 267, 340, 343, 375/346, 347, 350; 370/203, 204, 205, 208, 370/209, 210
See application file for complete search history.

(56) References Cited

U.S. PATENT DOCUMENTS 8,355,471 B2 * 1/2013 Khayrallah ................... 375/340
8,396,168 B2 * 3/2013 Khayrallah et al. .......... 375/324

2011/0051795 A1  3/2011  Khayrallah
2011/0051796 A1  3/2011  Khayrallah
2011/0051851 A1  3/2011  Khayrallah (Continued)

FOREIGN PATENT DOCUMENTS

| EP | 1703686 A1 | 9/2006 |
| GB | 2472906 A | 2/2011 |
| WO | 2007107955 A2 | 9/2007 |
| WO | 2011024129 A2 | 3/2011 |

OTHER PUBLICATIONS

Anderson, J. B., et al. "Sequential Coding Algorithms: A Survey and Cost Analysis." IEEE Transactions on Communications, vol. COM-32, No. 2, Feb. 1984.

(Continued)

*Primary Examiner* — Dhaval Patel
(74) *Attorney, Agent, or Firm* — Murphy, Bilak & Homiller, PLLC (57) ABSTRACT

The present disclosure provides an apparatus and method for advantageously simplifying joint detection processing in one or more demodulation stages of a multi-stage receiver by configuring at least one stage to use a constrained multi-user search, such as a constrained tree search. For example, a multi-stage receiver includes at least two stages configured to successively process a received composite signal that includes signal contributions from two or more "users", which, for example, means that the received signal includes two or more symbol streams. In a non-limiting example, particular embodiments of the present invention combines constrained tree searching with Serial Localized Indecision (SLIC) processing in a multi-stage receiver, where each stage includes a joint processing unit. At least one of those stages is configured to use a constrained multi-user search, rather than a full search, for jointly detecting symbols in the stage input signal.

16 Claims, 6 Drawing Sheets

(56) References Cited

U.S. PATENT DOCUMENTS

| | | |
|---|---|---|
| 2011/0051852 A1 | 3/2011 | Khayrallah |
| 2011/0051853 A1 | 3/2011 | Khayrallah |
| 2011/0096873 A1 | 4/2011 | Khayrallah |
| 2011/0103528 A1 | 5/2011 | Khayrallah |
| 2011/0243283 A1 | 10/2011 | Wang et al. |
| 2011/0255638 A1 | 10/2011 | Khayrallah et al. |
| 2011/0261872 A1 | 10/2011 | Wang et al. |
| 2012/0027139 A1 | 2/2012 | Khayrallah et al. |

OTHER PUBLICATIONS

Grant, S. J., et al. "Reduced Complexity Joint Detection Generalized Rake Receiver for WCDMA MIMO Systems." 2005 IEEE 61st Vehicular Technology Conference, vol. 1, May 30-Jun. 1, 2005.

Hochwald, B. M., et al. "Achieving Near-Capacity on a Multiple-Antenna Channel." IEEE Transactions on Communications, vol. 51, No. 2, Mar. 2003.

\* cited by examiner

METHOD AND APPARATUS FOR RECEIVED SIGNAL PROCESSING IN A MULTI-STAGE RECEIVER

RELATED APPLICATIONS

This application claims priority under 35 U.S.C. §119(e) from the U.S. provisional application filed on 29 Aug. 2011 and identified by application Ser. No. 61/528,322, which is incorporated herein by reference.

TECHNICAL FIELD

The present invention generally relates to communication signal processing, and particularly relates to signal processing in a multi-stage receiver.

BACKGROUND

Demodulation involves extracting an original information-bearing signal from a signal that is modulated in accordance with a particular symbol constellation and transmitted over a channel. The complexity of the demodulation process increases significantly for very large symbol constellations. Relatively large symbol constellations such as 16-, 32-and 64-QAM (Quadrature Amplitude Modulation) have been adopted in EDGE (Enhanced Data Rates for GSM Evolution), HSPA (High Speed Packet Access), LTE (Long Term Evolution) and WiMax (Worldwide Interoperability for Microwave Access). In HSPA, multi-code transmission creates even larger effective symbol constellations. Also, MIMO (Multiple-Input, Multiple-Output) schemes with two or more streams have been adopted in HSPA, LTE and WiMax. MIMO implementations also yield relatively large effective symbol constellations. Demodulation complexity further increases when any of these techniques occur in combination, e.g. multi-code and MIMO.

Consider a scenario where a MIMO transmitter transmits a communication signal to a MIMO receiver that uses joint detection. Assuming a non-dispersive channel, the received signal is given by $$r=Hc+n, \quad (1)$$

where r is the received signal, H is the estimated channel, c is the transmitted symbol vector, and n is white Guassian noise with covariance R. Assuming an N×N MIMO system—N transmit antennas and N receive antennas—then the terms r, c and n are N×1 vectors, and H is a N×N matrix. Working assumptions are that the components of H are independent and Rayleigh faded, all N signals are from the same symbol constellation Q of size q, and all N signals are transmitted with the same power. The effective symbol constellation for c is of size $q^N$.

The joint detector (JD) is the optimal receiver in this scenario. It searches over all $q^N$ candidates $\bar{c}=(\bar{c}_1,\ldots,\bar{c}_N)^T$ in $Q^N$ for one that minimizes the metric $$D_N(\bar{c})=(r-H\bar{c})^H R^{-1}(r-H\bar{c}), \quad (2)$$

where superscript T indicates the transpose and superscript H indicates the Hermitian, or conjugate transpose. The best candidate is denoted ĉ. While "full" Maximum Likelihood Detection or MLD represents the ideal demodulation scheme, its complexity increases substantially with increasing modulation order because of the size of involved symbol constellations. Other factors affecting the search space of MLD and, therefore, its feasibility, include the exponential effects of MIMO and the use of multi-codes.

Less complex solutions are available, such as sphere decoding (SD), where the demodulator tries to approximate the performance of MLD, but limits its search for the best solution to a subset of all possible transmitted signals, and where the subset is described by a sphere. A key step in SD is the triangular factorization of the channel matrix. This step simplifies the identification of candidate solutions in the sphere.

Another conventional demodulation technique is ITS (Iterative Tree Search) detection for MIMO QAM. ITS can be viewed as an alternative to SD. Like SD, ITS exploits the triangular factorization of the channel. Unlike SD, ITS uses the M-algorithm for reducing the search for the best candidate. ITS breaks down the search further by dividing the QAM constellation in its four quadrants, and represents each quadrant by its centroid in intermediate computations. The selected quadrant itself is subdivided again into its 4 quadrants, and so on.

This approach results in a quaternary tree search. Other conventional approaches give particular attention to the additional error introduced by the use of the centroids instead of true symbols. The error is modeled as Gaussian noise whose variance is determined and incorporated in likelihood computations. However, a tight connection is typically made between the centroid representation and the bit mapping from bits to symbols. That is, if a so-called multi-level bit mapping is employed, then identifying a quadrant is equivalent to making a decision on a certain pair of bits. Such constraints place a restriction on bit mappings, restricting the design of subsets.

Another detection approach, referred to as "serial localization with indecision," which is abbreviated as "SLI" or "SLIC." SLIC-based symbol detection represents a set of transmitted symbols by a series of approximations determined by serial detection stages. There are a number of SLIC-related references containing detailed examples of SLIC-based processing, including the following example references: U.S. 2011/0051795 A1, U.S. 2011/0051796 A1, U.S. 2011/0051851 A1, U.S. 2011/0051852 A1, and U.S. 2011/0051853 A1, all published on Mar. 3, 2011; U.S. 2011/0096873 A1 published on Apr. 28, 2011; U.S. 2011/0103528 A1 published on May 5, 2011; U.S. 2011/0243283 A1 published on Jun. 6, 2011; U.S. 2011/0255638 A1 published on Oct. 10, 2011; and U.S. 2011/0261872 A1 published on Oct. 27, 2011, all of which are incorporated by reference herein in their entirety.

While the above-identified references provide significant processing details and example receiver diagrams, it is useful here to generally review the SLIC-based approach to processing. In an L-stage SLIC, the received symbol vector is effectively represented as $$c=c^{[1]}+\ldots+c^{[L]}, \quad (3)$$

where stage i detects component $c^{[i]}$, using an effective alphabet derived from the true alphabet Q.

In a first SLIC stage, the symbol constellation Q is approximated by a set of centroids $Q^{[1]}$, of size $q^{[1]}<q$. Each centroid is an effective symbol in the effective symbol constellation $Q^{[1]}$ and represents a subset of Q. Moreover, the subsets have three properties: (1) the subsets overlap; (2) their union is equal to Q; and (3) all the subsets are shifted versions of the same set $O^{[1]}$ with centroid equal to 0. The overlap property is a key ingredient, as it enables the indecision feature of SLIC, which boosts demodulation performance.

If L>2, in the second stage $O^{[1]}$ plays the role of Q. That is, $O^{[1]}$ is approximated by a set of centroids $Q^{[2]}$, of size $q^{[2]}$, with the three properties previously identified, and based on a set $O^{[2]}$ with centroid 0. Processing proceeds similarly for all stages except the last. For the last stage L, there is no more approximation, and $Q^{[L]}=O^{[L-1]}$, and $O^{[L]}$ is empty. The outcome consists of the sets $Q^{[1]}, \ldots, Q^{[L]}$, which serve as the effective constellations for the L stages of the SLIC receiver.

Figure 1:
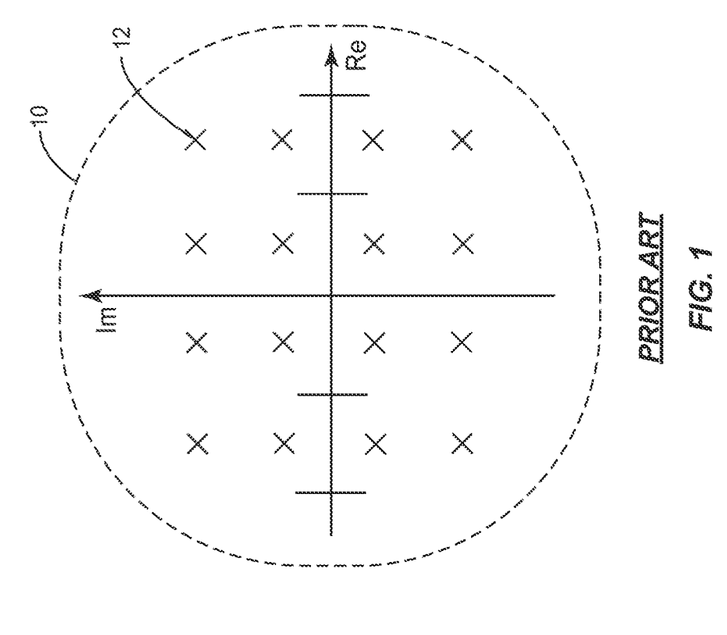
FIG. 1 is a diagram of a known symbol constellation.
Figure 2:
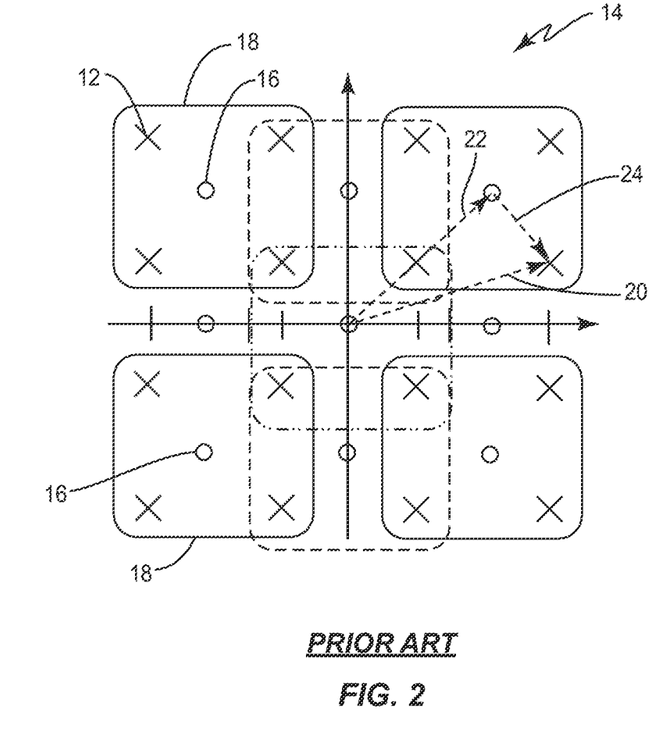
FIG. 2 is a diagram of a centroid-based constellation corresponding to the known symbol constellation of FIG. 1.

Consider a two-stage SLIC, where Q is a conventional symbol constellation 10 (also referred to as a conventional modulation constellation 10) having a number of defined constellation symbols or points 12, such as shown in FIG. 1, which depicts a known 16-QAM constellation. Correspondingly, FIG. 2 depicts a centroid representation of the symbol constellation 10, such as is known for use in SLIC-based processing.

Reference numeral 14 indicates the effective symbol constellation $Q^{[1]}$ corresponding to the actual symbol constellation 10 of FIG. 1. Here, "actual" denotes the symbol constellation actually used in transmit signal modulation. In that regard, the effective symbol constellation 14 represents a reduced or simplified version of the actual symbol constellation 10. Specifically, in the example illustration there are nine centroids 16 represented as circles centered within subsets 18 of the constellation points 12 of the actual symbol constellation 10. Each subset 18 of constellation points 12 represents a shifted version of the set $O^{[1]}$ containing the four symbols of Q nearest the origin (i.e., a QPSK constellation). Notably, the subsets 18 overlap, which is key to SLIC operation.

Thus, $Q^{[1]}$ is the effective symbol constellation for the first stage of the example two-stage SLIC receiver, and $Q^{[2]}=O^{[1]}$ is the effective symbol constellation for the second stage. Note that demodulation using the centroids 16 in $Q^{[1]}$ creates a mismatch with the transmitted symbols from Q—i.e., the actual constellation points 12—that results in an error signal, which we refer to as a residual transmitted signal. This is discussed in detail below. See "signal 20" representing the actual received symbol corresponding to one of the defined constellation points 12, versus "signal 22" corresponding to the closest centroid 16. The vector between the actual symbol and the centroid representation is represented by the residual transmitted signal 24.

In general, for each stage i of a multi-stage SLIC receiver the stage input is the modified received signal $r^{[i-1]}$ from the preceding stage, stage (i−1). Stage i assumes that the components $c^{[1]}, \ldots, c^{[i-1]}$ have been determined in earlier stages, and focuses on the demodulation of $c^{[i]}$. The residual transmitted signal $d^{[i]}=(c^{[i+1]}+\ldots+c^{[L]})$ belongs to the set $O^{[i]}$. The corresponding residual received signal is given by $Hd^{[i]}$, which shows the effect of modulation by the channel on the residual transmitted signal. Stage i models the residual received signal as a colored noise, with covariance $$\epsilon^{[i]}HH^H, \quad (4)$$

where $\epsilon^{[i]}$ is the average energy of the residual transmitted signal, which can be computed offline by averaging over the elements of the set $O^{[i]}$. Note that $\epsilon^{[1]}$ decreases as the stage index i grows, because there is less and less transmitted signal unaccounted for in the demodulation process. The total noise has covariance $$R^{[i]}=\epsilon^{[i]}HH^H+R. \quad (5)$$

The demodulation unit in each SLIC stage is a JD over constellation $Q^{[i]}$. In particular, the JD processing in each stage searches over all $(q^{[i]})^N$ candidates $\bar{c}^{[i]}$ in $(Q^{[i]})^N$ for the candidate symbol vector that minimizes the metric $D_N$ in (2), using the stage-specific covariance $R^{[i]}$ instead of R. The demodulation unit in each SLIC stage outputs the best candidate symbol vector as the stage decision vector $\hat{c}^{[i]}$.

The re-modulated signal $\hat{r}^{[i]}=H\hat{c}^{[i]}$ is subtracted from $r^{[i-1]}$ to produce the modified received signal $r^{[i]}$, which is fed to the next stage, stage (i+1). Of course, the first and last stages represent partial exceptions to the stage-specific operations outlined above. For example, the input to the first stage is the original received signal r. Nor does the last stage of a SLIC receiver include a re-modulation block.

The overall symbol decision is found by adding all the intermediate decisions. That is, the overall decision for a given received symbol vector is obtained by adding the stage decisions made by all of the SLIC stages, which can be expressed as $$\hat{c}=\hat{c}^{[1]}+\ldots+\hat{c}^{[L]}. \quad (6)$$

Thus, SLIC processing for a received Multiple-Input-Multiple Output (MIMO) signal with N symbols streams performs full searching over all N-tuples of the centroids used in a given stage, where each centroid represents a subset of symbols from the actual transmit symbol constellation. The use of centroids creates a residual received signal, which is accounted in the search metric as a colored noise, whose covariance is derived from the channel coefficients.

Even in view of the various "simplified" approaches to demodulation described above, there remain significant challenges in implementing demodulation processing that achieves near-optimal performance while simultaneously reducing the memory and/or processing requirements of full-complexity, optimal demodulation processing.

SUMMARY

Various embodiments of the present invention may include an apparatus and method for advantageously simplifying joint detection processing in one or more demodulation stages of a multi-stage receiver by configuring at least one stage to use a constrained multi-user search, such as a constrained tree search. For example, a multi-stage receiver includes at least two stages configured to successively process a received composite signal that includes signal contributions from two or more "users," which, for example, means that the received signal includes two or more symbol streams. In a non-limiting example, particular embodiments of the present invention combine constrained tree searching with Serial Localized Indecision (SLIC) processing in a multi-stage receiver, where each stage includes a joint processing unit. At least one of those stages is configured to use a constrained multi-user search, rather than a full search, for jointly detecting symbols in the stage input signal.

In one embodiment, a method of received signal processing within a stage of a multi-stage receiver includes receiving a stage input signal that comprises a received composite signal input to the multi-stage receiver if the stage in question is the first stage, or comprises a stage output signal from a preceding stage.

In either case, the stage input signal contains signal contributions for two or more users. In an example case, the received composite signal includes multiple symbol streams, so that at any given symbol time it includes more than one symbol. Here, the "two or more users" can be understood as two or more distinct symbol streams in the received composite signal, and corresponding signal contributions can be understood as multiple, concurrent symbols, one from each stream. In such an example, at any given symbol time, the received composite signal conveys an N×1 symbol vector for N symbol streams.

Correspondingly, the method includes determining impairment covariance as between the signal contributions, and in dependence on a signal energy of a stage residual transmitted signal, and further includes detecting a stage decision vector consisting of symbols from two or more of the signal contributions according to one or more effective symbol constellations having a reduced order as compared to actual symbol constellations used in transmission of the symbols. The stage residual transmitted signal and corresponding stage residual received signal thus arise from the use of the effective symbol constellations.

Notably, the processing used for detecting the symbols within the stage comprises performing a multi-user constrained search within a subspace of the full search space defined by all possibilities defined for the stage decision vector by the one or more effective symbol constellations. The process for performing the multi-user constrained search includes computing search metrics used for traversing the subspace of the constrained search, as a function of the impairment covariance.

Still further, the method includes outputting the stage decision vector as a detection output of the stage. If the stage is not the last stage of the multi-stage receiver, the method further includes outputting a stage output signal, based on said stage decision vector and the stage input signal, for input as the stage input signal to the next stage of the multi-stage receiver. Such outputting involves, for example, re-modulating the stage decision vector.

In another embodiment, a multi-stage receiver is configured to detect symbols from a received composite signal having signal contributions from two or more users, a symbol from each of two or more symbol streams. A least one stage of the multi-stage receiver includes a stage input configured to receive a stage input signal that comprises the received composite signal if the stage is the first stage of the multi-stage receiver, or comprises a stage output signal from a preceding stage if the stage is not the first stage.

The stage further includes an impairment covariance estimator configured to estimate impairment covariance as between the signal contributions, and in dependence on a signal energy of a stage residual signal, and additionally includes a demodulation circuit. The demodulation circuit is configured to detect stage decision vector representing symbols from two or more of the signal contributions according to one or more effective symbol constellations having a reduced order as compared to the actual symbol constellation(s) used in transmission of the symbols.

Notably, the demodulation circuit is configured to perform a multi-user constrained search within a subspace of a full search space defined by all possibilities defined for the effective symbol vector by the effective symbol constellation(s) used by the stage for symbol detection, including computing search metrics used for traversing the search subspace, as a function of the impairment covariance. Correspondingly, a detection output of the stage is configured to output the stage decision vector as the "stage decision" for that stage. If the stage is not the last stage, the stage also includes a re-modulation circuit that applies the channel estimates to the stage decision, to obtain a channelized version of the stage decision, which is then subtracted from the stage input signal to produce the stage output signal for input to the next stage.

Of course, the present invention is not limited to the above features and advantages. Indeed, those skilled in the art will recognize additional features and advantages upon reading the following detailed description, and upon viewing the accompanying drawings.

DETAILED DESCRIPTION

Figures 3, 4:
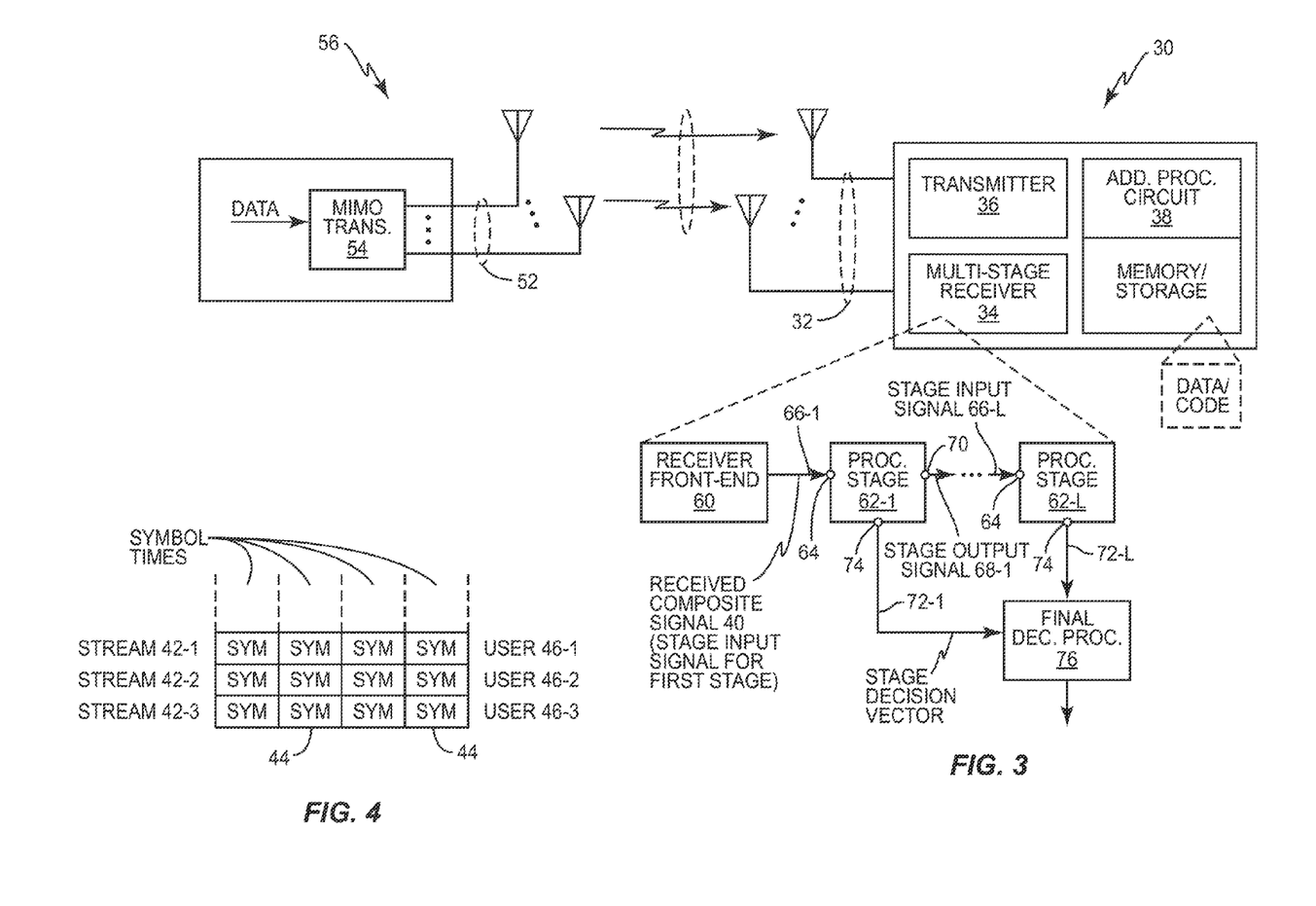
FIG. 3 is a block diagram of one embodiment of a wireless communication apparatus that implements constrained multi-user searching, e.g., constrained tree searching, for lowering the complexity of signal demodulation based on joint detection.
FIG. 4 is a diagram of example multi-user contributions in a communication signal.

FIG. 3 is a diagram of one embodiment of a wireless communication apparatus 30 ("apparatus 30") that is advantageously configured to demodulate symbols from a received communication signal using constrained tree searching. The apparatus 30 comprises a wireless communication device, for example, such as a network base station or mobile communication receiver. Non-limiting examples of the apparatus 30 include user equipment (UEs), such a cellular handsets, including smart phones and feature phones, network adaptors (modems), etc.

As depicted, the apparatus 30 includes a number of transmit/receive antennas 32, such as used for MIMO transmission and/or reception operation, a multi-stage receiver 34, a transmitter 36, and one or more additional processing circuits 38. Of course, those of ordinary skill in the art will appreciate that not all details of the apparatus 30 are germane to practicing the present invention. Indeed, the present invention and variations thereof can be practiced using a different arrangement of physical and/or functional circuits. It will also be understood that the apparatus 30 may include elements that are not illustrated, such as additional communication circuits, I/O circuitry, user interfaces, etc.

Of particular interest, the multi-stage receiver 34 is configured to detect symbols from a received composite signal 40 having signal contributions from two or more "users." Here, the term "users" does not necessarily mean different apparatuses and thus the phrase "signal contributions from two or more users" does not necessarily mean that the received composite signal 40 includes signal components targeted to more than one apparatus 30, although that may be the case in many scenarios. Instead, the "signal contributions for the two or more users" in the received composite signal 40 comprise signal contributions arising from one of: multiple; concurrent symbols; multiple, concurrent signals on different channelization codes; or multiple concurrent symbols from different co-channel interferers.

FIG. 4 therefore serves as a non-limiting example case, where the signal contributions in the received composite signal 40, which arise from two or more users, comprise multiple symbol streams 42-1, 42-2, and 42-3, each such stream 42 conveying a series of symbols 44 over a series of symbol transmission times. The (recurring) symbol times generally will be defined by the air interface protocol(s) in use, and each symbol stream 42-i is associated with a different "user" 46-i, e.g., stream 42-1 for user 46-1, stream 42-2 for user 46-2, and stream 42-3 for user 46-3. Of course, there may be fewer streams and users, or more streams and users, and the numbers may dynamically change with changing conditions and communication service scenarios. Further, it may be that more than one of the streams 42 in the received composite signal 40 carry symbols 42 targeted to the apparatus 30.

Turning back to FIG. 3, the multiple streams 42—e.g., N streams—may be conveyed in a communication signal 50, e.g., a MIMO signal transmitted by multiple transmit antennas 52 associated with a MIMO transmitter 54 that is included in a MIMO transceiver 56 remote from the apparatus 30. As a non-limiting example, the MIMO transceiver 56 comprises a node in a wireless communication network, such as a base station in a cellular communication network, and the apparatus 30 comprises a User Equipment (UE) or other wireless communication device configured for operation in the wireless communication network.

The apparatus 30 receives the communication signal 50 via its antenna(s) 32 and the multi-stage receiver 34 includes a receiver front-end 60 that filters, amplifies, down-converts, and digitizes the antenna-received signal to obtain the received composite signal 40. In turn, the received composite signal 40 is processed in successive stages 62 of the multi-stage receiver 34. There are "L" stages 62 illustrated, including at least a first stage 62-1 and a last stage 62-L. There may be one, none, or multiple intermediate stages 62 between the first and last stages 62-1 and 62-L.

At least one of the stages 62 of the multi-stage receiver 34 comprises: a stage input 64 configured to receive a stage input signal 66 that comprises the received composite signal 40 if the stage 62 is the first stage 62-1 of the multi-stage receiver 34, or comprises a stage output signal 68 from an output 70 of the preceding stage 62, if the stage 62 is not the first stage 62-1. With this nomenclature and with the use of suffixes to specific stages 62, one sees in the example of FIG. 3 that the received composite signal 40 serves as the stage input signal 66 applied to the stage input 64 of the stage 62-1. One also sees that the first stage 62-1 generates a stage output signal 68-1 for feeding to the next stage 62 in the series, and further generates a stage decision vector 72 that serves as the stage decision and which is output from a decision output 74. Indeed, each stage 62 outputs a stage decision vector 72, representing the candidate symbol decisions made by the stage. These stage decision vectors 72 feed into a final decision processor circuit 76, which determines the finalized candidate symbol vector decision from them.

Figure 5:
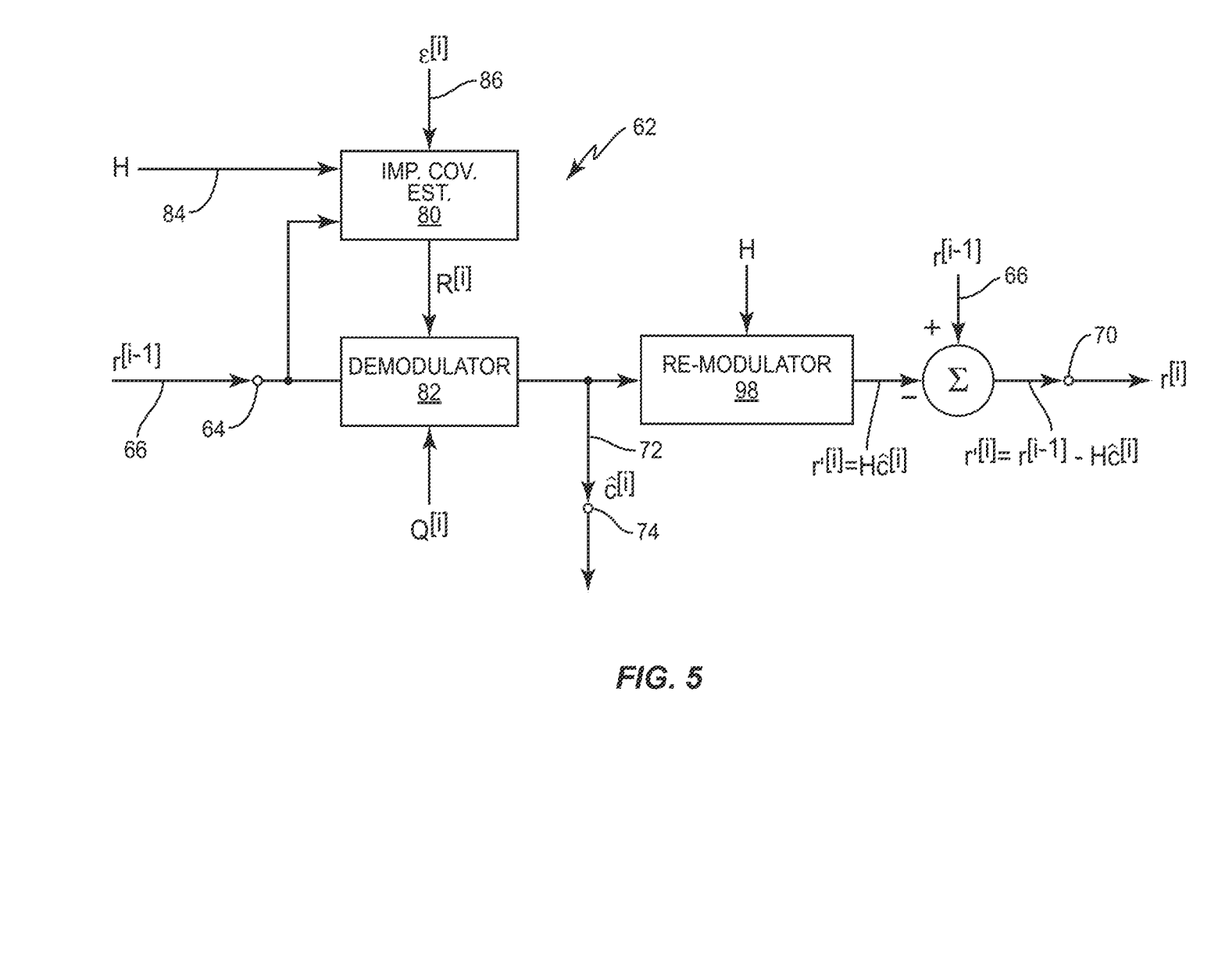
FIG. 5 is a block diagram of one embodiment of a functional circuit implementation for one or more of the stages illustrated in the multi-stage receiver shown in FIG. 3.

FIG. 5 illustrates an example circuit and processing configuration for a given stage 62 in the multi-stage receiver 34. The illustrated stage 62 is denoted as the i-th stage 62. Correspondingly, the stage input signal 66 is denoted as $r^{[i]}$, meaning that the stage input signal 66 is either the stage output signal 68, $r^{[i-1]}$, from the prior i-1 stage 62 or is the starting received signal r if the i-th stage 62 is the first stage 62-1. Similarly, the stage decision vector 72 provided on the decision output 74 will be recognized as being the stage decision vector Further, as the diagram assumes, the i-th stage 62 is not the last (L-th) stage 62 and the stage 62 therefore generates a re-modulated signal as $$\tilde{r}^{[i]} = H\hat{c}^{[i]},$$

which is then subtracted from $r^{[i-1]}$ to form $r^{[i]}$ as the stage output signal 68.

The illustrated stage 62 includes an impairment covariance estimator circuit 80 configured to estimate impairment covariance as between the signal contributions 42 in the stage input signal 66, and in dependence on a signal energy of a stage transmitted residual signal, which may be provided to the impairment covariance estimator circuit 80. Impairment covariance estimation also relies on channel estimates H, associated with propagation of the communication signal 50. These channel estimates are denoted as channel estimate signal 84 and it will be understood that the multi-stage receiver 34 includes channel estimation circuits to provide the channel estimates H.

It will also be understood that the demodulation circuit 82 is configured to perform symbol detection with respect to the stage input signal 66, and thus it generates the stage decision signal 72. In at least one embodiment, the demodulation circuit 82 is configured to detect an effective symbol vector representing symbols 44 from two or more of the signal contributions 42 according to one or more effective symbol constellations having a reduced order as compared to actual symbol constellations used in transmission of the symbols 44. For example, the symbols 44 correspond to particular constellation points 12 in the actual symbol constellation 10 in FIG. 1. Correspondingly, the one or more effective symbol constellations are the effective symbol constellation 14 shown by way of known example in FIG. 1, where a reduced number of constellation points 16 represent a subset of actual constellation points 12 in the actual symbol constellation 10.

It should be understood that each stage 62 generally uses a different effective symbol constellation 14 to represent the symbols 44 included in the multiple signal contributions 42 conveyed in the stage input signal 66 provided to that stage 62. Thus, when referring to "effective symbol constellations 14" and "effective constellation points 16" it will be understood in a stage-specific sense. Also, as a non-limiting example, for the last stage 62-L, the effective symbol constellation 14 is a reduced subset—e.g., one quadrant—of the actual symbol constellation 10. In such an example case, the effective constellation points or values 16 are the involved subset of actual symbol constellation points 12.

Finally, note that for the example of FIG. 2, the stage residual signal 86 shown in FIG. 5 is an example of the residual signal 24 shown in FIG. 2. The stage residual signal energy 86 ($\epsilon^{[i]}$) is a quantity known a priori for each i-th stage 62 as it is a function of the known relationship between the effective symbol constellation 14 ($Q^{[i]}$) used in the i-th stage 62 and the actual symbol constellation 10.

The demodulation circuit 82 is configured to perform a multi-user constrained search within a subspace of a full search space defined by all possibilities defined for the effective symbol vector by said one or more effective symbol constellations 14, including computing search metrics used for traversing the subspace, as a function of the impairment covariance.

Correspondingly, the stage decision output 74 provides the stage decision vector as the stage decision signal 72, i.e., as a detection output of the stage 62. Further, if the stage 62 is not the last stage, the stage 62 includes a re-modulation circuit 98 that is configured to generate the stage output signal 68 for input to a next stage 62 of the multi-stage receiver 34—i.e., as noted earlier the stage output signal 68 for the i-th stage 62 is denoted as $r^{[i]}$ and is produced as $$r^{[i]} = r^{[i-1]} - r'^{[i]}$$

$$= r^{[i-1]} - H\hat{c}^{[i]}$$

where, as previously noted, $r^{[i-1]}$ is the stage input signal 66 to the i-th stage, H represents the channel estimates, and $\hat{c}^{[i]}$ represents the stage decision made in the i-th stage 62.

In at least one embodiment, the demodulation circuit 82 is configured to perform a multi-user constrained tree search as the multi-user constrained search noted above, and to compute the above-noted search metrics as branch and path metrics for at least a portion of a search tree structurally defined by the one or more effective symbol constellations 14. Further, the demodulation circuit 82 is configured to compute a total metric as a function of the branch and path metrics, where the total metric corresponds to a best candidate set of effective symbol values for the effective symbol vector.

Additionally, in at least one embodiment, the demodulation circuit 82 is configured to perform one of a breadth-first constrained tree search, a depth-first constrained tree search, or any combination thereof, as the above-noted multi-user constrained tree search. For example, the demodulation circuit 82 is configured to perform an M-algorithm search as a breadth-first constrained tree search. As such, the demodulation circuit 82 progresses from a root node of the search tree based on computing the path metrics for q children at a next level of the search tree and identifying from the path metrics the M best surviving nodes at said next level, and thereafter extending the M best surviving nodes from each further level of the search tree until reaching a last level N. Here, N is an integer number equal to the number of users being detected in the effective symbol vector.

In another embodiment, the demodulation circuit 82 is configured to perform, as a constrained tree search, a stack algorithm that compares nodes at different levels in the search tree. Here, the stack algorithm begins at a root node of the search tree, and successively traverses the search tree upward from the root node by maintaining a stack of candidate nodes initialized with the root node, identifying the best node in the stack and replacing it with its children nodes, until the best node in the stack is a leaf node at a level N, where N equals the number of users being detected.

Additionally, in at least one embodiment, the received composite signal 40 comprises a MEMO signal comprising N symbol streams 42 and the demodulation circuit 82 is configured to detect an effective symbol from each of two or more of said N symbol streams, as the effective symbol vector.

In the same or another embodiment, the above-described stage 62 is configured as a SLIC-based processing stage, wherein the one or more effective modulation (symbol) constellations 14 each comprise a centroid representation of actual constellation points 12 in a corresponding actual symbol constellation 10. Alternatively, such as in a last stage 62-L, the effective symbol constellation 14 comprises an associated subset of actual constellation points 12 in the corresponding actual symbol constellation 10.

With these example stage details in mind, at least one stage 62 in the multi-stage receiver 34 of the depicted apparatus 30 jointly detects the symbols 44 in a received symbol vector using only a portion of the corresponding full search tree, thereby reducing processing complexity while simultaneously delivering good detection performance. That is, the size of the received symbol vector to be jointly detected within a stage 62 defines the overall size of the full search tree to be used for joint detection. With higher-order symbol constellations, the search tree size becomes quite large, but with the advantageous teachings herein, the tree search based joint detection is constrained to a portion or subset of the overall search tree in a manner that still yields performance comparable to a full search.

Thus, the apparatus 30 achieves good demodulation performance using joint detection based on partial or constrained tree searching, based on exploiting the decomposition of the channel matrix, and manipulation of the search metric into a sum of partial metrics. This desirable form of the search metric enables the use of efficient tree search techniques to perform the constrained search. The residual signals, or the other streams, are still accounted for as colored noise, and are incorporated into the metric. The M-algorithm and the stack algorithm as detailed examples of a constrained tree search for joint processing in a SLIC embodiment of the multi-stage receiver 34. However, it is recognized herein that any suitable tree search can be used, once the metric has been manipulated into the desired form.

For simplicity of discussion and by way of non-limiting example, the below discussion focuses on a SLIC-based example, and highlights the manipulation of the search metric into a sum of partial metrics, which enables tree search. In particular, the M-algorithm is presented as an example of a breadth first tree search, and the stack algorithm as an example of a depth first tree search.

Tree searching requires that the joint detection (JD) metric be expressed in sum form to use a constrained tree search instead of the full search JD in SLIC stages. Enabling the tree search approach requires manipulation of the detection metric $D_N$ introduced in Eq. (2) in the background section into a sum of partial metrics. For now, the discussion focuses on the general MIMO problem. Later, the discussion presents specific example details for constrained tree searching within the context of the SLIC receiver structure.

The set of $Q^N$ constellation points is represented with a full q-ary tree with depth N. The root node $\phi$ at level 0 represents the null vector. A branch from level k-1 to level k is associated with a symbol $\bar{c}_k$. A node at level K is associated with a symbol vector $\bar{c}_{1:K} = (\bar{c}_1, \ldots, \bar{c}_K)^T$, consistent with the branch symbols $\bar{c}_k$ on the path from the root node to the current node. (In particular, a leaf node at the last level N represents a full-length vector $\bar{c}_{1:N} = \bar{c}$.) The fan-out of a node $\bar{c}_{1:K-1}$ consists of the q children nodes $\bar{c}^{1:K}$ that extend $\bar{c}_{1:K-1}$ with the q different values of $\bar{c}_K$.

To establish a tree search, the JD metric $D_N(\bar{c}_{1:N})$ is manipulated into a particular incremental form, as a sum of N terms, where term K depends only on $\bar{c}^{1:K}$. The term K operates as a branch metric for the branch $\bar{c}_K$ in the fan-out of node $\bar{c}_{1:K-1}$. The approach further involves assigning to a node $\bar{c}_{1:K}$ the partial sum over the branch metrics along the path from the root node to $\bar{c}_{1:K}$, such that the partial sum serves as a path metric. The path metric of the root node $\phi$ is set to 0, so the path metrics of the leaf nodes are consistent with the JD metric. This setup supports any tree search.

While visualization of the full search tree for JD over an N×1 symbol vector is useful, particular implementations of the constrained tree searching enabled by the techniques described herein advantageously do not require that the full search tree be "built" in working memory for processing, and thus does not require full population of the associated branch and path metrics. Indeed, the contemplated constrained tree search effectively builds a very sparse sub-tree, with only a relative few nodes being "visited" before the search ends. Advantageously, the path and branch metrics need only be computed for those nodes and branches that are visited during the search.

As for manipulation of the JD metric, consider the special case of white noise with uniform variance, $R=\sigma^2 I$. (Later discussion presents the more general case of colored noise.) In a useful manipulation, the JD metric is expressed as $$D_N(\bar{c}) = (r - H\bar{c})^H(r - H\bar{c})/\sigma^2 = \sum_{k=1}^{N} |r_k - H_k\bar{c}|^2/\sigma^2, \quad (7)$$

where $H_k$ is row k of H. Note that depending on $H_k$, any symbol $\hat{c}_j$ may contribute to any term $|r_k-H_k\bar{c}|^2$ in the sum. In order to suit the tree search, it is necessary to manipulate $D_N$ into the incremental form discussed above.

One approach for spherical decoding expresses the JD metric as $$D_N(\bar{c})=((\tilde{c}-\bar{c})^H H^H H(\tilde{c}-\bar{c})+r^H r-\tilde{c}^H H^H H\tilde{c})/\sigma^2, \quad (8)$$

where $$\tilde{c}=(H^H H)^{-1} H^H r, \quad (9)$$

is the unconstrained least squares (ULS) estimate of vector c. It is unconstrained in the sense that it treats c as a vector of continuous variables, instead of discrete constellation elements. The last two terms in Eq. (8) do not depend on $\bar{c}$ and can be dropped. Doing so has no effect on metric comparisons. Accordingly, one may define $$E_N(\bar{c})=(\tilde{c}-\bar{c})^H H^H H(\tilde{c}-\bar{c})/\sigma^2. \quad (10)$$

The next step is to decompose the Hermitian matrix $H^H H/\sigma^2$ as $$H^H H/\sigma^2 = L^H L, \quad (11)$$

where L is a lower triangular matrix. The decomposition is achieved, e.g., using Cholesky factorization. Now, $E_N(\bar{c})$ may be expressed as $$E_N(\bar{c}) = (\tilde{c} - \bar{c})^H L^H L(\tilde{c} - \bar{c}) \quad (12)$$
$$= \sum_{k=1}^{N} \left| L_{k,k}(\tilde{c}_k - \bar{c}_k) + \sum_{j=1}^{k-1} L_{k,j}(\tilde{c}_j - \bar{c}_j) \right|^2.$$

These manipulations allow the branch metric to be expressed as $$e_k(\bar{c}_{1:k-1}, \bar{c}_k) = \left| L_{k,k}(\tilde{c}_k - \bar{c}_k) + \sum_{j=1}^{k-1} L_{k,j}(\tilde{c}_j - \bar{c}_j) \right|^2, \quad (13)$$

which depends on $\bar{c}_{1:k}$ only, as desired. The path metric is the partial sum $$E_K(\bar{c}_{1:K}) = \sum_{k=1}^{K} e_k(\bar{c}_{1:k-1}, \bar{c}_k) \quad (14)$$
$$= \sum_{K-1} (\bar{c}_{1:K-1}) + e_K(\bar{c}_{1:K-1}, \bar{c}_K).$$

The recursive form in the second equality provides an efficient mechanism for computing the path metrics incrementally.

Finally, going back to the tree, the branch metric $e_K(\bar{c}_{1:K-1}, \bar{c}_K)$ is assigned to the branch $\bar{c}_K$ in the fan-out of node $\bar{c}_{1:K-1}$, and the path metric $E_K(\bar{c}_{1:K})$ to the node $\bar{c}_{1:K}$. The path metric of a leaf node is offset from its JD metric by a constant.

The extension to the colored noise case follows naturally. Starting with the colored noise metric $D_N$ in Eq. (2) with noise covariance R and using similar manipulations as in the white noise case, then $$E_N(\bar{c})=(\tilde{c}-\bar{c})^H L^H L(\tilde{c}-\bar{c}). \quad (15)$$

Now L is a lower triangular matrix satisfying $$L^H L = H^H R^{-1} H \quad (16)$$

and $$\tilde{c}=(H^H R^{-1} H)^{-1} H^H R^{-1} r. \quad (17)$$

Given the new L and $\tilde{c}$, the expressions for $e_k(\bar{c}_{1:k-1}, \bar{c}_k)$ and $E_K(\bar{c}_{1:K})$ are the same as before.

Now, using the basic M-algorithm as an example of a breadth first constrained tree search, the search complexity is controlled by the value M. Starting from the root node, at level 1 the path metrics of the q children are computed, and the best M candidates are kept, while the rest are discarded. At level 2, the M surviving nodes are extended by their fan-out, and the path metrics of their Mq children are compared. Again, the best M nodes are kept, and the rest are discarded. This process continues till the last level N, where Mq leaf nodes are reached. The output of the search is the symbol vector $\hat{c}$ corresponding to the best leaf node.

Note that in early stages, there may be fewer than M candidate nodes to choose from, for instance in stage 1 if M>q. Then all nodes are kept.

Turning to depth-first approaches, a basic stack algorithm serves as an example of a depth first constrained tree search. One characterizing feature of the stack algorithm is that it compares nodes at different levels in the tree. The stack algorithm works with a list of nodes, with the best candidate with the smallest path metric on top (hence the "stack"). Correspondingly, the proper path metric is the Fano metric, which is a modification of $E_K$. The best node is removed from the stack. Its q children nodes are added to the stack. The new best node is identified and put on top of the stack.

The stack algorithm is initialized with the null vector at the root node. It stops when the node at the top of the stack is a leaf node with length K=N. The output of the search is the symbol vector corresponding to that leaf node.

Because the stack algorithm compares paths of different length on the tree, its metric needs an adjustment. To understand the need for this adjustment, consider the comparison of two unequal length vectors $\bar{c}_{1:K}$ and $\bar{c}'_{1:K'}$ with K<K'≤N. Simply taking the path metric difference does not work well, as such an approach would yield $$E_{K'}(\bar{c}'_{1:K'}) - E_K(\bar{c}_{1:K}) = \quad (18)$$
$$\sum_{k=1}^{K} (e_k(\bar{c}'_{1:k-1}, \bar{c}'_k) - e_k(\bar{c}_{1:k-1}, \bar{c}_k)) + \sum_{k=K+1}^{K'} e_k(\bar{c}'_{1:k-1}, \bar{c}'_k).$$

The second summation in Eq. (18) is unbalanced and always nonnegative, so the path metric difference tends to be positive. Hence the shorter vector wins out too easily. Better balancing the comparison requires accounting for the missing symbols of each sequence. One way to provide for that accounting adds a nonnegative bias $\beta_k$ that does not depend on the missing symbols, and represents an estimate of the branch metric. The choice of bias is discussed further below. With the bias, the resulting total path metric is given by $$E_k(\bar{c}_{1:K}) + \sum_{k=K+1}^{N} \beta_k. \quad (19)$$

Furthermore, it is convenient to subtract the term $\Sigma_{k=1}^{N}\beta_k$ from Eq. (19). This has no effect on vector metric comparisons. The resulting metric can be written as $$F_k(\bar{c}_{1:K}) = E_K(\bar{c}_{1:K}) - \sum_{k=1}^{K} \beta_k = \sum_{k=1}^{K} (e_k(\bar{c}_{1:k-1}, \bar{c}_k) - \beta_k). \quad (20)$$

Identifying the Fano branch metric as $$f_k(\bar{c}_{1:k-1}, \bar{c}_k) = e_k(\bar{c}_{1:k-1}, \bar{c}_k) - \beta_k, \quad (21)$$

then $F_K \bar{c}_{1:K}$) is the Fano path metric. It can be expressed in the recursive form $$F_K(\bar{c}_{1:K}) = F_{K-1}(\bar{c}_{1:K-1}) + f_K(\bar{c}_{1:K-1}, \bar{c}_K). \quad (22)$$

Going back to the tree representation, for the stack algorithm the branch metric $e_k(\bar{c}_{1:k-1}, \bar{c}_k)$ is replaced with the Fano branch metric $f_k(\bar{c}_{1:k-1}, \bar{c}_k)$, and the path metric $E_K(\bar{c}_{1:K})$ with the Fano path metric $F_K(\bar{c}_{1:K})$.

Using standard analysis, it can be shown that conditioned on the decision ĉ being equal to the transmitted vector c, the expected value of the JD metric $E_N(\hat{c})$ is N , independent of the covariance R. Since $E_N(\hat{c})$ is the sum of N branch metrics, then it is reasonable to use the bias $$\beta_k = 1, \quad (23)$$

for all levels k.

More generally, the bias can be used to control complexity. For instance, suppose the same bias value is used for all k. Then a smaller bias value favors shorter paths, and expands the breadth of the search, which takes longer to end. A larger bias value favors longer paths, and shrinks the breadth of the search, which ends quicker.

With the above in mind, particular implementations of the techniques described herein can reduce processing complexity even when the apparatus 10 employs reduced-complexity demodulation processes, such as where the multi-stage receiver 34 uses SLIC to reduce complexity by replacing the actual symbol constellation 10 with a smaller centroid constellation 14 in each stage 62. (Here, it is worth emphasizing that FIG. 2 illustrates one example of a centroid-based effective symbol constellation 14. However, those of ordinary skill in the art will appreciate that the effective symbol constellation 14 used in any given stage 62 will be different than the effective symbol constellation 14 used in the prior stage 62, e.g., it may be a reduced-order, centroid-based representation of the preceding stage's effective symbol constellation 14.)

Notably, however, with previously known SLIC implementation, each SLIC stage performed a "full" search over the JD search space applicable to that stage. Thus, even with SLIC implementations, receiver complexity may still be large without use of the techniques described herein, for instance in MIMO scenarios with a large number of streams N.

Again, particular implementations of the described techniques advantageously provide constrained tree searching in the joint processing function of one or more of the stages 62, such as where the stages 62 are configured to perform SLIC processing and one or more of them performs SLIC processing using a constrained tree search. The multi-stage receiver 34 in this regard may use a stack algorithm or an M-algorithm. More generally, it may use breadth-first searching, depth-first searching, or a hybrid approach that combines breadth-first and depth-first techniques. Further, while the described techniques may provide significant advantages in MIMO scenarios (HSPA or LTE), these techniques may also directly apply to other contexts in which a number of signals are jointly demodulated, e.g., multi-code in the HSPA downlink and/or multi-user in the HSPA uplink.

Figure 6:
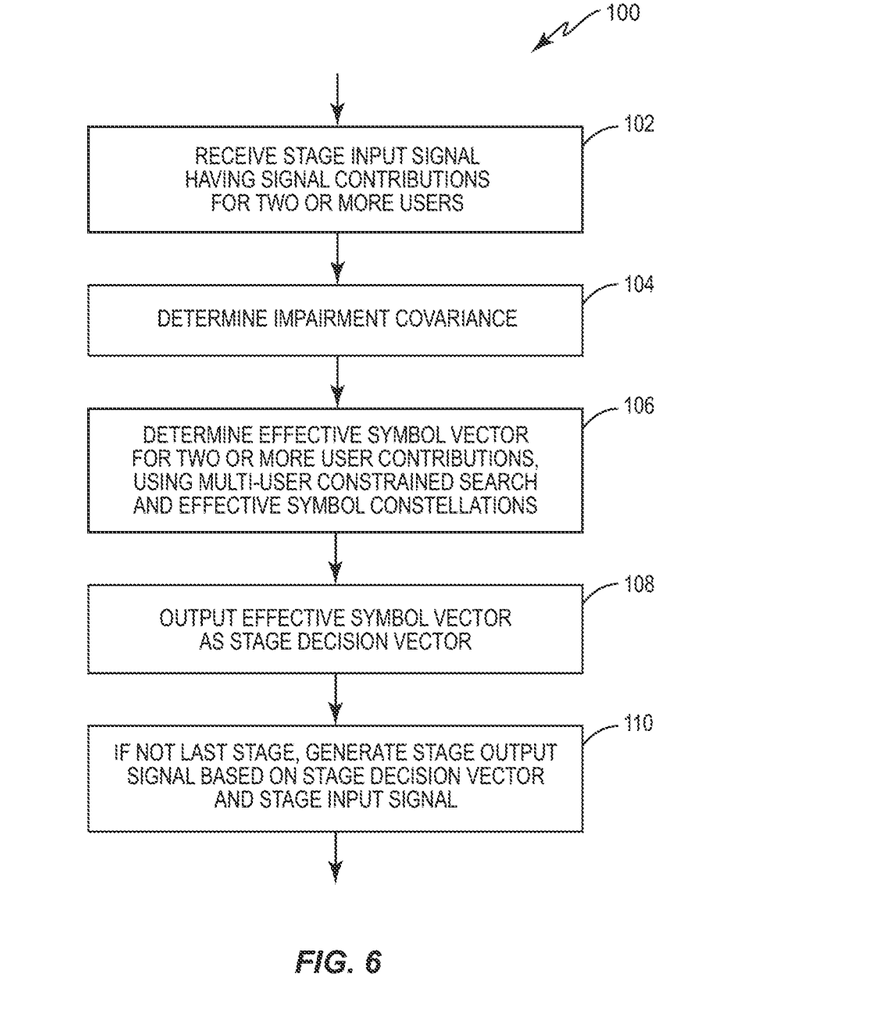
FIG. 6 is a logic flow diagram of one embodiment of a method of performing a constrained multi-user search in a given stage of a multi-stage receiver, such as the one illustrated in FIG. 3.

FIG. 6 illustrates a broad example of the above-detailed processing, wherein a stage 62 of the multi-stage receiver 34 uses a constrained tree search in its JD processing. It will be understood that the method 100 of FIG. 6 is carried out, for example, by digital processing circuitry within the multi-stage receiver 34, where such circuitry physically or at least functionally implements the circuits illustrated in FIGS. 3 and 5, for example. In at least one embodiment, at least some of that circuitry is implemented in one or more microprocessors, DSPs, or other digital processing circuits that are configured to implement the illustrated method based at least in part on executing computer program instructions stored in memory or in another computer-readable medium in or accessible to the apparatus 30.

The illustrated method 100 presents processing for a single stage 62 of the multi-stage receiver 34, and the processing thus should be understood as being stage-specific, unless otherwise noted. Such processing "begins" with receiving a stage input signal 66 having signal contributions 42 for two or more users 46 (Block 102):

Processing continues with determining a (stage-specific) impairment covariance that expresses the covariance between the signal contributions (Block 104), and correspondingly determining an effective symbol vector for symbols 44 conveyed in two or more of the signal contributions 42 included in the stage input signal 66 (Block 106).

Here, the determination of the "best" (most closely matching) effective symbol vector representing the symbols 44 in terms of the effective symbol constellation 14 in use by the stage 62 is based on JD processing using constrained tree searching, as described above. The effective symbol vector, i.e., the stage decision vector $\hat{c}^{[t]}$, is output as the stage decision signal 72 (Block 108). Processing further includes, if the stage 62 is not the last stage 62-L, generating a stage output signal 68, for feeding into the next stage 62 (as the stage input signal 66 for that next stage 62) (Block 110). Here, the stage output signal 68 is generated based on re-modulating the stage decision vector $\hat{c}^{[t]}$ (using the channel estimates H) and subtracting it from the stage input signal 66.

Figure 7:
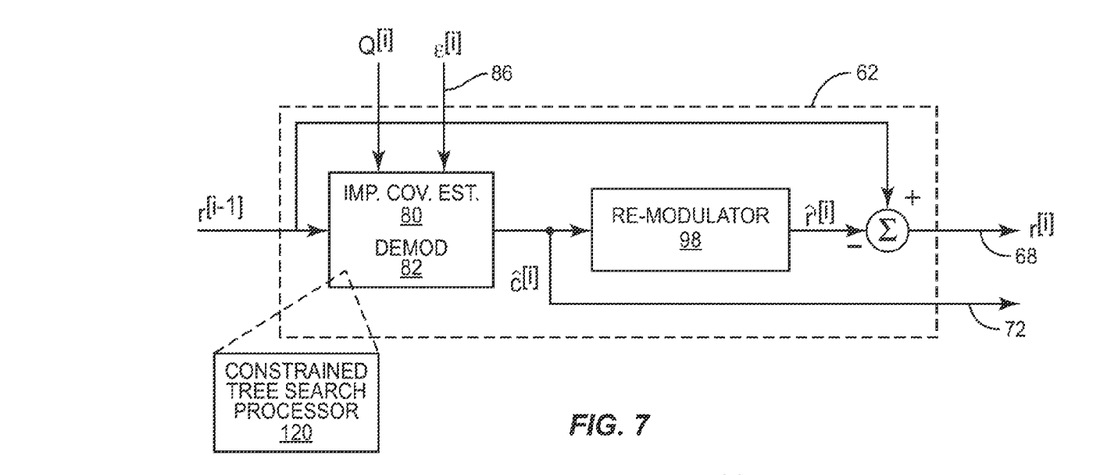
FIG. 7 is a block diagram illustrating further example details for an embodiment of a stage in a multi-stage receiver that uses constrained, multi-user searching for joint detection over a set or subset of symbols in a symbol vector being demodulated in the stage.
Figure 8:
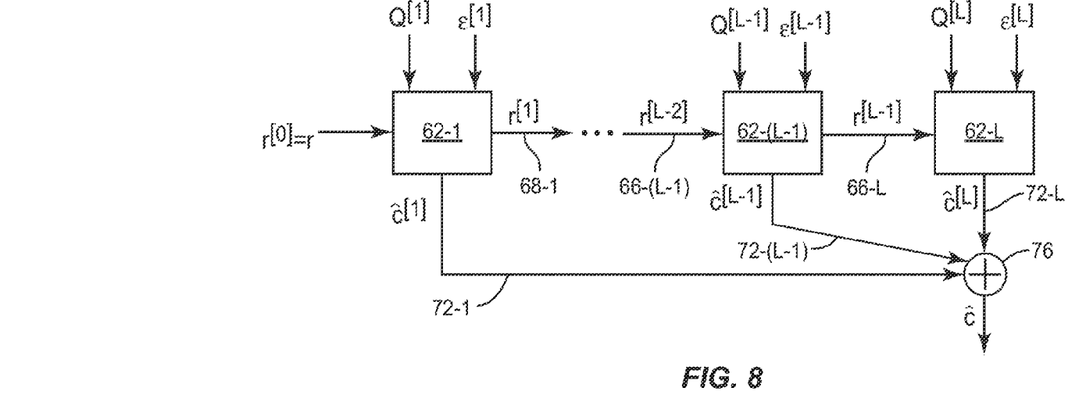
FIG. 8 is a block diagram illustrating further example details for a multi-stage receiver.

FIGS. 7 and 8 illustrate such stage processing, where FIG. 7 focuses on a given stage 62 and FIG. 8 illustrates a series of stages 62. One sees that the demodulation circuit 82 in the illustrated stage 62 of FIG. 7 uses the covariance $R^{[t]}$ in Eq. (5) instead of R in the formulation of the triangular matrix L in Eq. (16), and the unconstrained least squares estimate č in Eq. (17). For example, the demodulation circuit 82 includes or is associated with digital processing circuitry configured as a constrained multi-user search processor 120.

Note that the centroid constellation $Q^{[t]}$ (i.e., an effective symbol constellation 14) is used instead of the actual symbol constellation 10, denoted as Q. Critically, the full search is replaced by a constrained tree search over a $q^{[t]}$-ary tree. The branch metric $e_k$ is computed according to Eq. (13), and the path metric $E_K$ is computed according to Eq. (14). For instance, the M-algorithm can be used in this context. For the stack algorithm, the Fano branch metric $f_k$ is computed according to Eq. (20), and the Fano path metric $F_K$ is computed according to Eq. (22).

As noted, however, the described techniques may be applied to other tree search algorithms and the simple stack algorithm is one of many constrained tree search algorithms. It belongs to the family of depth first algorithms, which includes many variants of the stack algorithm, and the sphere decoder. Other constrained tree search algorithms belong to the breadth first family. This includes many variants of the M-algorithm. One variant uses M=1 which results in the DFE solution. This effectively solves the triangular system of equations formed by the Cholesky factorization using a forward substitution process. Overall, any constrained tree search algorithm can be used with the proposed solutions, once the metric has been manipulated into the desired form.

Figure 9:
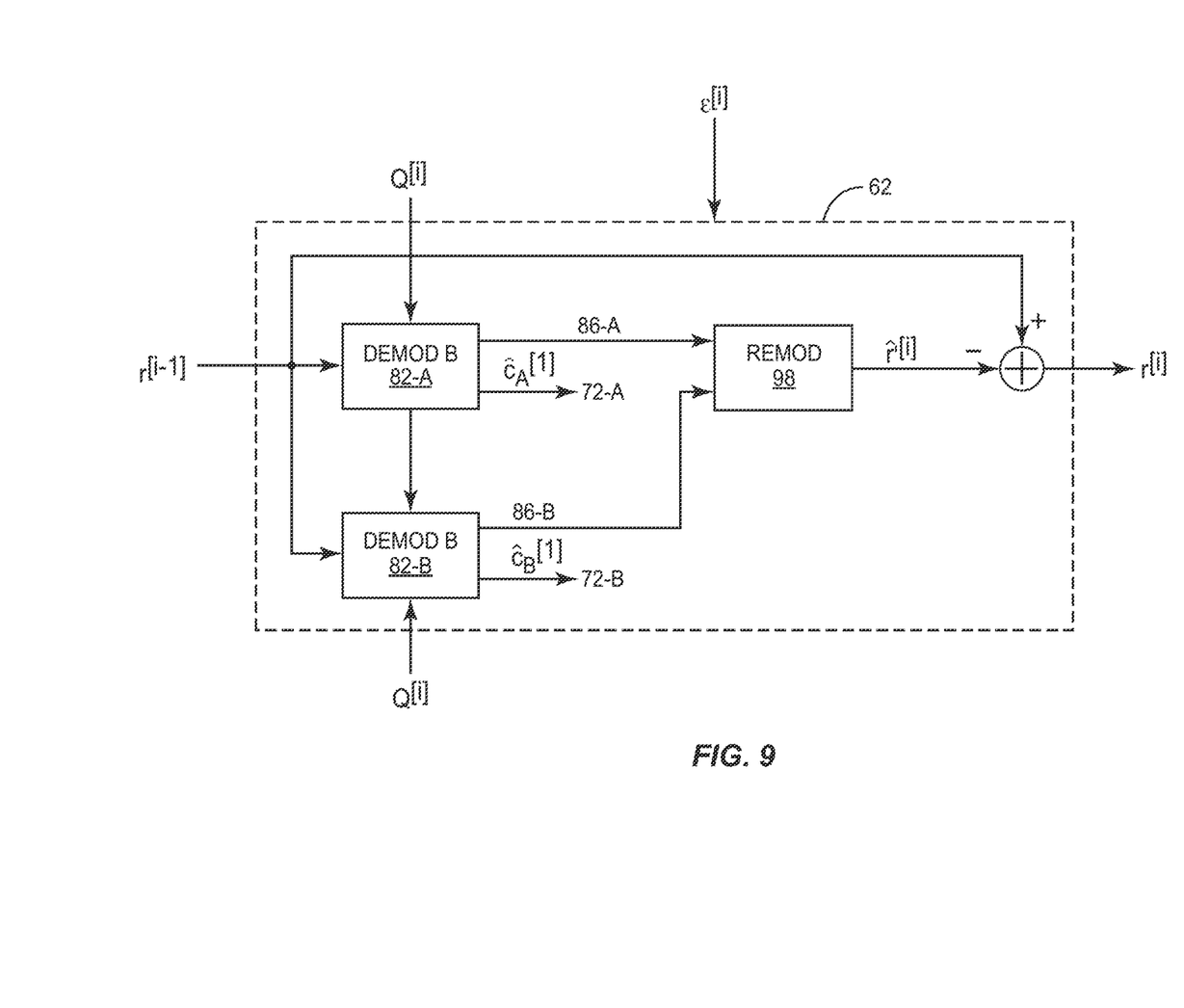
FIG. 9 is a block diagram illustrating yet another embodiment of a stage in a multi-stage processor, where a set of symbols to be detected are divided into subsets and joint detection is performed on subset basis.

Further, in a variant SLIC structure contemplated herein and illustrated in FIG. 9, assume there are N symbols 44 associated with N signal contributions 42 included in the stage input signal 66 provided to a given stage 62. These N symbols 44 are divided into subsets A and B and joint detection processing is applied to one subset of symbols 44 at a time, where constrained tree searching is used for joint detection over the subset. The search metric is modified accordingly, to account for the streams not included in the joint search as an additional colored noise in the noise covariance. An example of a SLIC stage with two stream subsets is shown in FIG. 9, where the demodulation circuit 82 shown in the earlier example illustrations is implemented as two demodulation circuits 82-A and 82-B, where each one performs joint detection over for a subset of the N symbols 44 conveyed in the stage input signal 66. In this regard, once the noise covariance has been modified to reflect the presence of other streams—i.e., the symbols 44 outside of the selected subset—the rest of the processing is the same as described above.

It is possible to dynamically select the subsets of streams 42 to be processed jointly as a function of the channel H. Once the subsets have been identified in any given stage 62 of SLIC, a constrained multi-user, e.g., a constrained tree search, can be used for joint detection over the selected subset(s).

A further embodiment contemplated herein is based on varying the search complexity at different stages 62 of the multi-stage receiver 34. Referring back to FIG. 8, for example, constrained multi-user searching may be used in the SLIC-based detection performed in each stage 62 (62-1, ..., 62-L). As discussed earlier, the complexity of a constrained tree search can be controlled, for instance by varying the M parameter in the M-algorithm, or the bias parameter in the stack algorithm. The preferred embodiment is to lower the complexity in earlier stages 62, compared to later stages 62. However, in principle the complexity for any stage can be tuned differently.

Further simplification may be achieved by replacing the tree search at one or more stages by a quantized version of the unconstrained least squares (ULS) estimate in Eq. (17). The preferred embodiment is to use a ULS in one or more earlier stages 62, while maintaining a tree search in the later stage(s) 62, but in principle any ordering is possible.

This disclosure presents a method for using a tree search algorithm in conjunction with a serial localization with indecision (SLIC) receiver. SLIC is a reduced complexity demodulator for MIMO. It has a serial structure, where each stage includes a joint processing unit. In the original formulation of SLIC, for a MIMO system with N transmit streams, that joint processing unit consists of a full search over all candidate N-tuples of centroids. Each centroid represents a subset of symbols from the symbol constellation. The use of centroids creates a residual signal, which is accounted in the search metric as a colored noise, whose covariance is derived from the channel coefficients.

In a variant structure, the N symbols are divided into subsets, and the joint processing unit is applied to one subset of symbols at a time, still using a full search. The search metric is modified accordingly, to account for the streams not included in the joint search as an additional colored noise.

This disclosure teaches replacing the full search with a constrained search, with the aim of reducing complexity even further while still maintaining very good performance. Exploiting the decomposition of the channel matrix allows for manipulation of the search metric into a sum of partial metrics. This desirable form enables the use of efficient tree search techniques to perform the constrained search. The residual signals, or the other streams, are still accounted for as colored noises, and incorporated into the metric.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of received signal processing within a stage of a multi-stage receiver, said method comprising:
    receiving a stage input signal that comprises a received composite signal input to the multi-stage receiver if said stage is a first stage of the multi-stage receiver, or comprises a stage output signal from a preceding stage if said stage is not the first stage, said stage input signal containing signal contributions for two or more users;
    determining impairment covariance as between said signal contributions, and in dependence on a signal energy of a stage residual signal;
    detecting an effective symbol vector representing symbols from two or more of the signal contributions according to one or more effective symbol constellations having a reduced order as compared to actual symbol constellations used in transmission of the symbols, said stage residual signal arising from use of said effective symbol constellations, and wherein said detecting comprises performing a multi-user constrained search within a subspace of a full search space defined by all possibilities defined for said effective symbol vector by said one or more effective symbol constellations, including computing search metrics used for traversing said subspace, as a function of said impairment covariance; and
    outputting said effective symbol vector as a stage decision vector serving as a detection output of said stage and, if said stage is not a last stage of the multi-stage receiver, outputting a stage output signal based on said stage decision vector and said stage input signal, for input to a next stage of the multi-stage receiver.

2. The method of claim 1, wherein said performing the multi-user constrained search comprises performing a multi-user constrained tree search, and wherein said computing said search metrics comprises computing branch and path metrics for at least a portion of a search tree structurally defined by said one or more effective symbol constellations, and further comprising computing a total metric as a function of the branch and path metrics, said total metric corresponding to a best candidate set of effective symbol values for said effective symbol vector.

3. The method of claim 2, wherein said performing the multi-user constrained tree search comprises one of performing a breadth-first constrained tree search, or performing a depth-first constrained tree search, or any combination thereof.

4. The method of claim 3, wherein said performing the breadth-first constrained tree search comprises performing an M-algorithm search wherein processing progresses from a root node of the search tree based on computing the path metrics for q children at a next level of the search tree and identifying from the path metrics the M best surviving nodes at said next level, and thereafter extending the M best surviving nodes from each further level of the search tree until reaching a last level N, where N is an integer number equal to the number of users being detected in said effective symbol vector.

5. The method of claim 3, wherein said performing the depth-first constrained tree search comprises performing a stack algorithm that compares nodes at different levels in said search tree, and wherein said stack algorithm begins at a root node of said search tree, and successively traverses the search tree upward from the root node, by maintaining a stack of candidate nodes initialized with the root node, identifying the best node in the stack and replacing it with its children nodes, until the best node in the stack is a leaf node at a level N, where N equals the number of users being detected.

6. The method of claim 1, wherein the signal contributions for said two or more users comprises signal contributions arising from one of: multiple, concurrent symbols, multiple, concurrent signals on different channelization codes, or multiple concurrent symbols from different co-channel interferers.

7. The method of claim 1, wherein the received composite signal comprises a Multiple-Input-Multiple-Output (MIMO) signal comprising N symbol streams, said signal contributions for said two or more users correspond to said N symbol streams, and said detecting the effective symbol vector comprises detecting an effective symbol from each of two or more of said N symbol streams.

8. The method of claim 1, wherein said detecting the effective symbol vector comprises performing Serial Localization with Indecision (SLIC) processing in said stage, wherein the one or more effective symbol constellations each comprise a centroid representation of actual constellation points in a corresponding actual symbol constellation, or comprise an associated subset of actual constellation points in the corresponding actual symbol constellation.

9. A multi-stage receiver configured to detect symbols from a received composite signal having signal contributions from two or more users, wherein at least one stage of said multi-stage receiver comprises:
a stage input configured to receive a stage input signal that comprises the received composite signal if said stage is a first stage of the multi-stage receiver, or comprises a stage output signal from a preceding stage if said stage is not the first stage, said stage input signal containing signal contributions for two or more users;
an impairment covariance estimator configured to estimate impairment covariance as between said signal contributions, and in dependence on a signal energy of a stage residual signal;
a demodulation circuit configured to detect an effective symbol vector representing symbols from two or more of the signal contributions according to one or more effective symbol constellations having a reduced order as compared to actual symbol constellations used in transmission of the symbols, said stage residual signal arising from use of said one or more effective symbol constellations in said detection, and wherein said demodulation circuit is configured to perform a multi-user constrained search within a subspace of a full search space defined by all possibilities defined for said effective symbol vector by said one or more effective symbol constellations, including computing search metrics used for traversing said subspace, as a function of said impairment covariance; and
a decision output configured to output said effective symbol vector as a stage decision vector serving as a detection output of said stage and, if said stage is not a last stage of the multi-stage receiver, a re-modulation circuit configured to generate a stage output signal based on said stage decision vector and the stage input signal, for input to a next stage of the multi-stage receiver.

10. The multi-stage receiver of claim 9, wherein said demodulation circuit is configured to perform a multi-user constrained tree search as said multi-user constrained search, and to compute said search metrics as branch and path metrics for at least a portion of a search tree structurally defined by said one or more effective symbol constellations, and to compute a total metric as a function of the branch and path metrics, said total metric corresponding to a best candidate set of effective symbol values for said effective symbol vector.

11. The multi-stage receiver of claim 10, wherein said demodulation circuit is configured to perform one of a breadth-first constrained tree search, a depth-first constrained tree search, or any combination thereof, as said multi-user constrained tree search.

12. The multi-stage receiver of claim 11, wherein said demodulation circuit is configured to perform an M-algorithm search as said breadth-first constrained tree search, wherein said demodulation circuit progresses from a root node of the search tree based on computing the path metrics for q children at a next level of the search tree and identifying from the path metrics the M best surviving nodes at said next level, and thereafter extending the M best surviving nodes from each further level of the search tree until reaching a last level N, where N is an integer number equal to the number of users being detected in said effective symbol vector.

13. The multi-stage receiver of claim 11, wherein said demodulation circuit is configured to perform a stack algorithm that compares nodes at different levels in said search tree, and wherein said stack algorithm begins at a root node of said search tree, and successively traverses the search tree upward from the root node, by maintaining a stack of candidate nodes initialized with the root node, identifying the best node in the stack and replacing it with its children nodes, until the best node in the stack is a leaf node at a level N, where N equals the number of users being detected.

14. The multi-stage receiver of claim 9, wherein the signal contributions for said two or more users comprises signal contributions arising from one of: multiple, concurrent symbols, multiple, concurrent signals on different channelization codes, or multiple concurrent symbols from different co-channel interferers.

15. The multi-stage receiver of claim 9, wherein the received composite signal comprises a Multiple-Input-Multiple-Output (MIMO) signal comprising N symbol streams and said signal contributions for said two or more users are said N symbol streams, and wherein said demodulation circuit is configured to detect an effective symbol from each of two or more of said N symbol streams, as said effective symbol vector.

16. The multi-stage receiver of claim 9, wherein said stage is configured as a Serial Localization with Indecision (SLIC) processing stage, wherein the one or more effective symbol constellations each comprise a centroid representation of actual constellation points in a corresponding actual symbol constellation, or comprise an associated subset of actual constellation points in the corresponding actual symbol constellation.

* * * * *

UNITED STATES PATENT AND TRADEMARK OFFICE
CERTIFICATE OF CORRECTION

PATENT NO. : 8,630,375 B2
APPLICATION NO. : 13/545611
DATED : January 14, 2014
INVENTOR(S) : Khayrallah et al.

It is certified that error appears in the above-identified patent and that said Letters Patent is hereby corrected as shown below:

In the Specification

In Column 1, Line 45, delete "Guassian" and insert -- Gaussian --, therefor.

In Column 2, Lines 2-3, delete "approximate.the" and insert -- approximate the --, therefor.

In Column 6, Line 67, delete "multiple;" and insert -- multiple --, therefor.

In Column 7, Line 1, delete "multiple," and insert -- multiple --, therefor.

In Column 8, Line 1, delete "vector" and insert -- vector $\hat{c}^{[i]}$ --, therefor.

In Column 9, Line 46, delete "MEMO" and insert -- MIMO --, therefor.

In Column 14, Line 31, delete "(Block 102):" and insert -- (Block 102). --, therefor.

Signed and Sealed this
Twenty-second Day of July, 2014

Michelle K. Lee
*Deputy Director of the United States Patent and Trademark Office*